March 13, 1934.   A. A. LENHART ET AL   1,951,058
DUMP WAGON
Filed Jan. 20, 1932   3 Sheets-Sheet 2

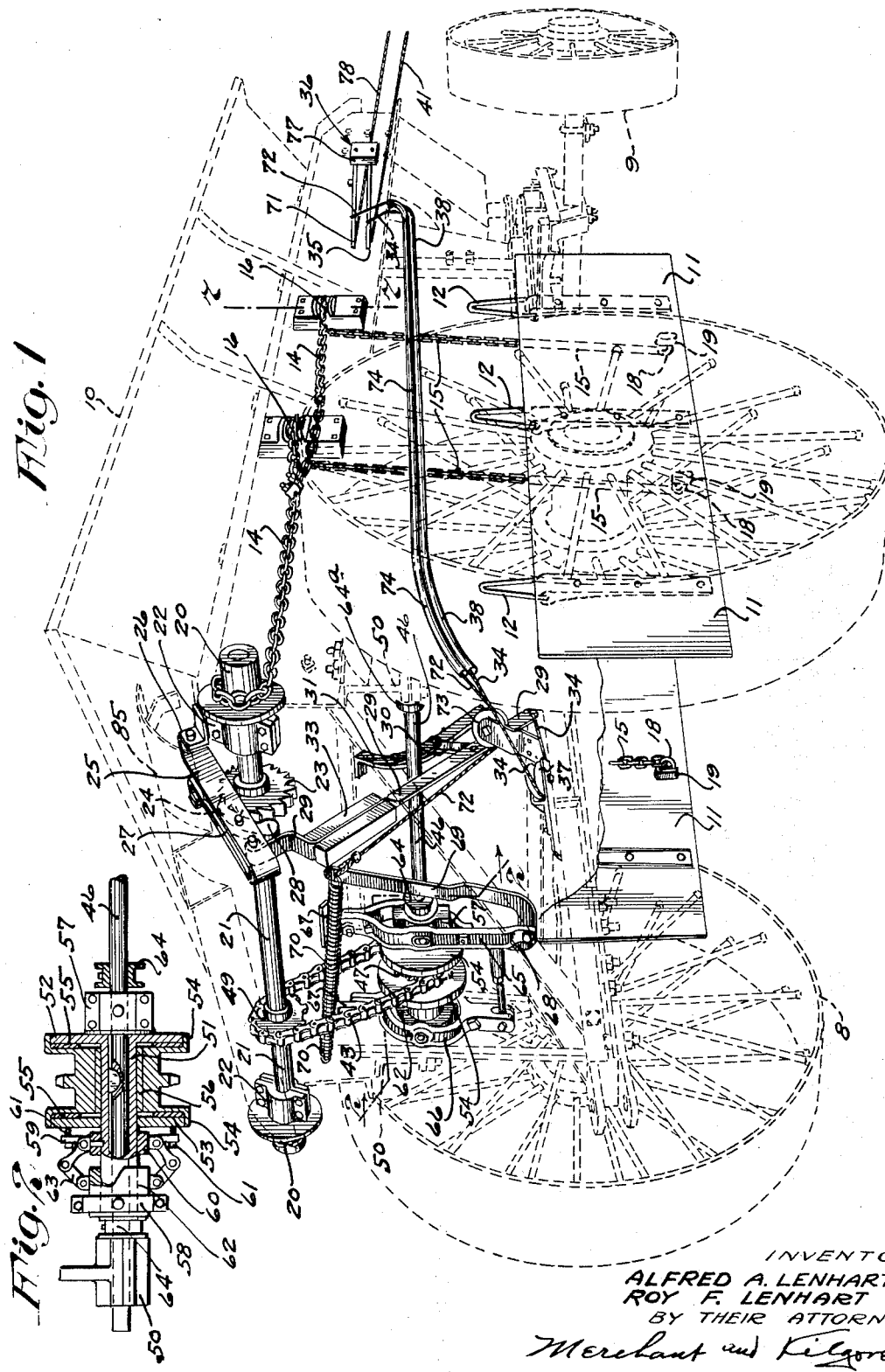

INVENTORS
ALFRED A. LENHART
ROY F. LENHART
BY THEIR ATTORNEYS

March 13, 1934.  A. A. LENHART ET AL  1,951,058
DUMP WAGON
Filed Jan. 20, 1932   3 Sheets-Sheet 3
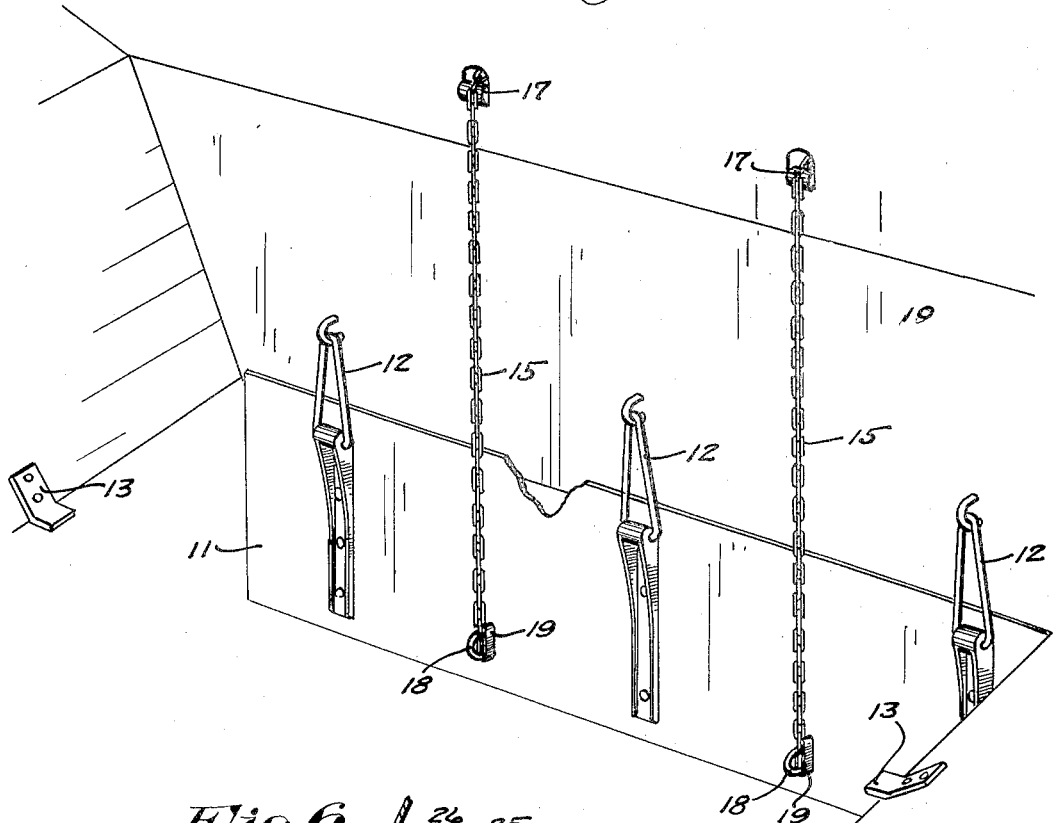
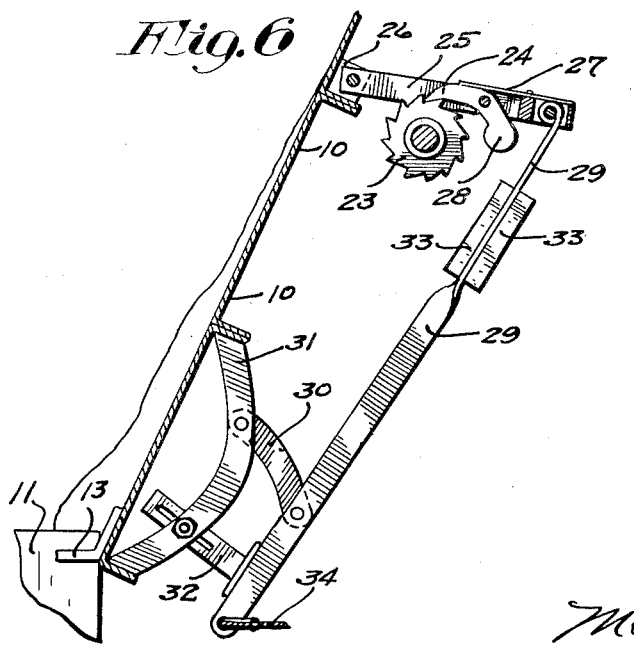
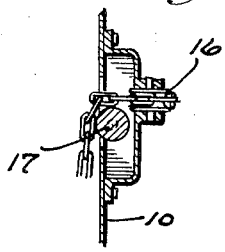
INVENTORS
ALFRED A. LENHART
ROY F. LENHART
BY THEIR ATTORNEYS
Merchant and Kilgore Patented Mar. 13, 1934

1,951,058

UNITED STATES PATENT OFFICE 1,951,058

DUMP WAGON

Alfred A. Lenhart and Roy F. Lenhart, Minneapolis, Minn.

Application January 20, 1932, Serial No. 587,659

7 Claims. (Cl. 298—35)

Our present invention relates to improvements in dumping vehicles of the bottom opening hopper-type and has for its object the provision of highly efficient operating mechanism for the bottom sections or doors thereof.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of a dump wagon having the invention embodied therein, said wagon being diagrammatically illustrated by means of broken lines, except its doors;

Fig. 2 is a detail view with some parts sectioned on the line 2—2 of Fig. 1 on an enlarged scale;

Fig. 5 is a fragmentary perspective view looking at the right hand side of the wagon box from the inside thereof;

Fig. 6 is a detail view partly in elevation and partly in section taken on the line 6—6 of Fig. 3, on an enlarged scale; and Fig. 7 is a detail view principally in section taken on the line 7—7 of Fig. 1, on an enlarged scale.

Figure 3:
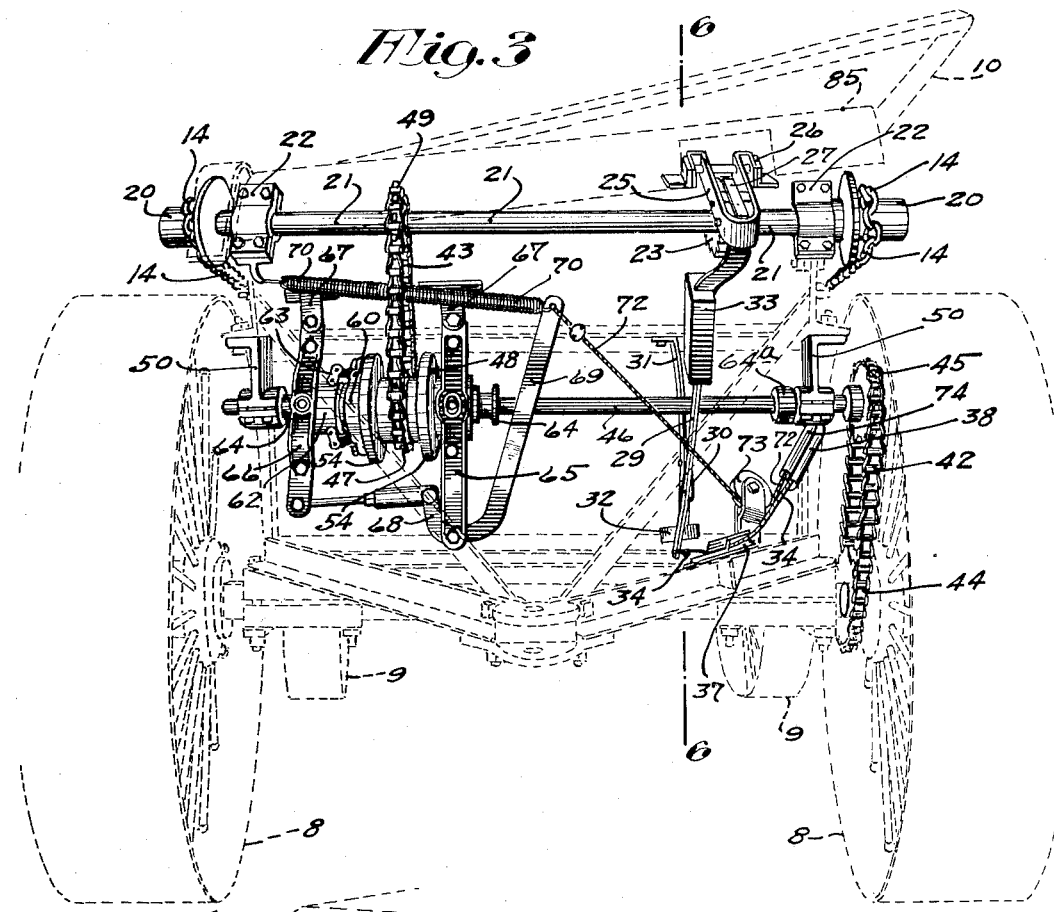
Fig. 3 is a view corresponding to Fig. 1 but looking at the wagon from the rear thereof.

The dump wagon illustrated is of the open bottom hopper-type having a pair of oppositely opening bottom sections or doors. Of the parts of the dump wagon illustrated, it is important to note the rear wheels 8, front wheels 9, body 10, bottom sections or doors 11, that are connected to the sides of the body 10 by hinges 12, and front and rear stop plates 13 against which said doors are held closed. The dump wagon is especially well adapted to be drawn by a tractor as a trailer. If desirable two or more wagons may be coupled together and drawn by a single tractor.

When the wagon is on level or substantially level ground the doors 11, when open, will hang by gravity in vertical positions. In case the wagon is on uneven ground and tilted laterally to either side, the door 11 on the low side of the wagon will be held by its hinges 12 from swinging outward of the plane of the respective side of the wagon so that said door is never out of control of the mechanism for lifting the same, as will presently appear. The stop plates 13 limit the lifting or closing movements of the doors 11.

The doors 11 are closed by a pair of main lifting cables 14 which extend horizontally at the sides of the body 10 on the exterior thereof and substantially parallel thereto. Each cable 14 has on its front end a pair of branch cables 15 which extend through horizontally spaced openings in the sides of the body 10 and hang downward on the inside of said body. The branch cables 15 of each pair run over flanged guide sheaves 16 and guide rollers 17, the former of which are arranged to turn about vertical axes and the latter of which are arranged to turn about horizontal axes and said sheaves and rollers are journaled on the body 10. These branch cables 15 are attached to the doors 11, near their free longitudinal edges, by U-shaped members 18 anchored in said doors.

Spacing blocks 19 on the legs of the attaching members 18 are interposed between the inner sides of the doors 11 and the attached ends of the branch cables 15. The purpose of these spacing blocks 19 is to hold the branch cables 15 slightly oblique to the sides of the body 10 and the doors 11 when open so that there will be an outward pull on the doors 11 during the initial lifting movement thereof and thus facilitate the closing of the doors and prevent the same from locking against lifting movement. As shown, the main cables 14 and their branches 15 are chains.

To close the doors 11 the main cables 14, at their rear ends, are secured to a pair of small drums 20 and arranged to be wound thereon. These drums 20 are secured to the outer ends of a windlass shaft 21 and have guard flanges on their inner ends for the cables 14. The windlass shaft 21 is journaled in bearings 22 on the body 10 at the rear end thereof.

A ratchet wheel 23 and a cooperating dog 24 are provided for holding the windlass shaft 21 against rotation under the action of the pull on the main cables 14 produced by the weight of the doors 11 and the load thereon and said ratchet wheel and dog hold said doors closed. The ratchet wheel 23 is keyed to the windlass shaft 21 and the dog 24 is intermediately pivoted to and between the side members of a U-shaped carrier 25 which extends transversely over said shaft and its side members are pivoted at their ends to a bearing 26 on the rear end of the body 10 for vertical swinging movement. A leaf spring 27 on the carrier 25 yieldingly holds the dog 24 for action on the ratchet wheel 23 and a counterweight 28 on the rear end of said dog holds the same against the spring 26 when the carrier 25 is operated to lift the dog 24 out of engagement with the ratchet wheel 23.

The following connections are provided for lifting the carrier 25 to disengage the dog 24 from the ratchet wheel 23 and release the windlass shaft 21 to permit the doors 11 to open by gravity and the weight of the load thereon and at which time the main cables 14 are unwound from the drums 20 by rotating the windlass shaft 21, to wit: A vertically disposed arm 29 is pivoted at its upper end to the rear or outer end of the carrier 25 and is connected, near its lower end, by a link 30 to a bracket 31 on the rear end of the body 10.

An adjustable stop 32 on the bracket 31 limits the pivotal movement of the arm 29 toward the rear end of the body 10 under the action of the link 30 and gravity to properly position the dog 24 in operative relation to the ratchet wheel 23. A weight 33 on the arm 29 assists gravity in holding the carrier 25 with the dog 24 for action on the ratchet wheel 23. One end of the cable 34 is attached to the lower end of the arm 29 and its other end is attached to the outer end of a trip arm 35 pivoted to a bearing 36 on the body 10 at the front end thereof for horizontal swinging movement. This cable 34 from the arm 29 runs over a guide sheave 37 on the rear end of the body 10 and through a conduit 38 on the exterior of the right side of the body 10 and its front end portion extends laterally through said side.

A coiled spring 39 anchored to an angle plate 40 on the body 10 is attached to the arm 35 intermediate of its ends. This spring 39 is under strain to swing the trip arm 35 rearward, put slack in the cable 34 to release the arm 29 and permit the carrier 25 to move downward and position the dog 24 in an operative position in respect to the ratchet wheel 23.

An operating cable 41 for the trip arm 35 has one of its ends attached to the free end of said arm 35, extends forward from the wagon to a tractor or other means for drawing said wagon, not shown, and within reach of the operator thereof. By pulling on the cable 41 the operator may trip the dog 24 out of engagement with the ratchet wheel 23 and thereby permit the doors 11 to open and dump the load from the wagon.

The windlass shaft 21 is rotated, at will, to wind the main cables 14 on the drums 20, from the right hand traction wheel 8 by sprocket chains 42 and 43. The sprocket chain 42 runs over a sprocket wheel 44 on the inner end of the hub of the right hand traction wheel 8 and a sprocket wheel 45 on the right hand end of a countershaft 46. The sprocket chain 43 runs over a sprocket wheel 47 on the driven member of a friction clutch 48 and a sprocket wheel 49 on the windlass shaft 21. The countershaft 46 extends parallel to the windlass shaft 21 and is journaled in bearings 50 on the rear end of the body 10 below said windlass shaft.

The driving member of the clutch 48 is a long sleeve 51 keyed to the countershaft 46 for rotation therewith but with freedom for slight axial movement thereon. Fixed to the right hand end of the sleeve 51 is a relatively large disk 52 and a similar disk 53 is keyed to the sleeve 51 for rotation therewith but with freedom for a limited axial movement thereon. The sprocket wheel 47 is between the disks 52 and 53 and has on the ends of its hub a pair of drums 54 in which said disks work. Interposed between the backs of the drums 54 and the disks 52 and 53 are friction rings 55 of any suitable material. The hub of the sprocket wheel 47 is turnably mounted on a wooden bushing 56 which, in turn, is turnably mounted on the sleeve 51.

The disks 52 and 53 are pressed toward each other and onto the friction rings 55 to set the clutch 48 and rotate the sprocket wheel 47 with the countershaft 46, by a pair of shipper collars 57 and 58. The shipper collar 57 is loose on the shaft 46, bears directly against the outer face of the disk 52, and the shipper collar 58 acts on the disk 53 through a pair of diametrically opposite bell-cranks 59 pivoted at their elbows to a collar 60 pinned to the sleeve 51 for rotation therewith. On the short arms of the bell-cranks 59 are machine screws 61 which impinge against the outer face of the disk 53 and affords take-up devices between the disk 53 and bell-cranks 59. The shipper collar 58 is swivelled to a collar 62 loose on the sleeve 51 and links 63 connect the long arms of the bell-cranks 59 to said collar. Fixed collars 64 on the shaft 46 outward of the shipper collars 57 and 58 limit the separation of said shipper collars during the release of the clutch 48.

A pair of vertically disposed shipper levers 65 and 66 are provided for simultaneously operating the shipper collars 57 and 58, respectively. These shipper levers 65 and 66 are intermediately pivoted to the shipper collars 57 and 58, respectively, and fulcrumed at their upper ends to bearings 67 on the body 10. The shipper levers 65 and 66 are operated by a toggle lever 68 which comprises a short arm and a long arm, the former of which is pivoted to the lower end of the shipper lever 65 and the latter of which is pivoted to the lower end of the shipper lever 66. Said toggle lever 68 is operated to set and release the clutch 48 by connections that include an upstanding arm 69, the lower end of which is integral with the outer end of the short arm of the toggle lever 68. The arm 69 and the short arm of the toggle lever 68 are in the form of a bell-crank and the long arm of the toggle lever 68 comprises two longitudinally adjustable sections that are operable, at will, to vary the operative length of the toggle lever 68 and adjust the shipper collars 57 and 58 in respect to the disks 52 and 53.

A long coiled spring 70 anchored at one of its ends to the body 10 is attached at its other end to the upper end of the arm 69 and under strain to straighten the toggle lever 68 and release the clutch 48. The connections for operating the toggle lever 68 further include an arm 71, above the arm 35 and attached to the bearing 36 by the same pivot, and a cable 72, one end of which is attached to the upper end of the arm 69, and the other end of which is attached to the arm 71 near its free end. This cable 72 runs over a guide sheave 73 on the rear end of the body 10 and through a long conduit 74 that extends substantially parallel to the conduit 38 and is secured to the body 10.

A coiled spring 75 anchored to an angle plate 40 on the body 10 is attached to the arm 71 intermediate of its end and under strain to yieldingly hold the arm 71 drawn rearward and put slack in the cable 72 so as to permit the spring 70 to hold the clutch 48 released. A stop 77 on the bearing 36 limits the rearward movement of the arms 35 and 71 by their springs 39 and 75, respectively.

A cable 78 is provided for moving the arm 71 forward against the tension of the spring 75 to set the clutch 48 and by which said clutch may be held set. One end of the cable 78 is attached to the outer end of the arm 71, extends forward substantially parallel to the cable 41 to within reach of the operator on the tractor or other motive power for drawing the dump wagon. In addition to this means for setting the clutch 48 the same may be set by drawing laterally on the cable 72 at any of its exposed parts either at the front or the rear of the wagon.

Left hand collar 64 by engagement with the left hand bearing 50 limits the movement of the shaft 46 toward the left; and a third collar 64ᵃ on said shaft engages right hand bearing 50 to limit movement of shaft 46 toward the right, directions being taken in respect to Fig. 3.

The cables 41 and 78 extend through eyes 79 in a vertical tie-member 80' on the front end of the body 10 at the transverse center thereof. The purpose of these eyes 79 is to hold the cables 41 and 79 so that they always have a direct pull on the arms 35 and 71 when the tractor is moving in a straight line or on a curve and when moving on a curve the cables 41 and 78 will swing laterally outward of the eyes 79, one position of which is indicated by broken lines in Fig. 4.

A latch 80 is provided for automatically engaging and holding the trip arm 35, against the tension of its spring 39, when moved forward to lift the carrier, through the connections 34 and 29, and move the dog 24 out of its operative position in respect to the ratchet wheel 23 and release the windlass shaft 21 and allow the doors 11 to open. This latch 80 is in the form of a hook on the free end of a gravity-positioned arm pivoted to a bearing bracket 81 on the body 10 and which hook has a forwardly extended cam surface 82. The bottom member of the bearing bracket 81 affords a stop to limit the downward movement of the latch 80 and position its cam surface 82 to be engaged by the trip arm 35 during its forward movement to lift said latch and permit the arm 35 to move thereunder and be engaged thereby when said latch drops by gravity.

To automatically release the latch 80 and permit the spring 39 to swing the arm 35 rearward to put slack in the cable 34 and allow the dog 24 to be reset by gravity, as previously described, there is rigidly secured to the pivoted end of the latch 80 a release bar 83 having on its outer end at the lower edge thereof, a cam surface 84. This release bar 83 is in the plane of the latch 80 and spaced thereabove with its cam surface 84 positioned to be engaged by the arm 71, during its initial forward opening movement to set the clutch 48, and lift the latch 80 out of engagement with the arm 35. When the arm 35 is released by the latch 80 its spring 39 returns the same to normal position, puts slack in the cable 34, and allows the carrier 25 to drop by gravity and automatically position the dog 24 in operative relation to the ratchet wheel 23. Further forward movement of the arm 71 will set the clutch 48 and rotate the windlass shaft 21 through its operating connections from the rear right hand traction wheel 8 and wind the main cables 14 on their drums 20 to close the doors 11.

On the rear end of the body 10 above the windlass shaft 21 is a rearwardly and downwardly inclined apron 85 diagrammatically illustrated by means of broken lines. The purpose of this apron 85 is to protect the mechanism mounted on the rear end of the body 10 from falling dirt or other materials during the loading of the wagon. By reference to Fig. 4 it will be noted that the front end portion of the body 10 affords a housing for the arms 35 and 71 and other mechanism closely associated therewith.

Operation

Figure 4:
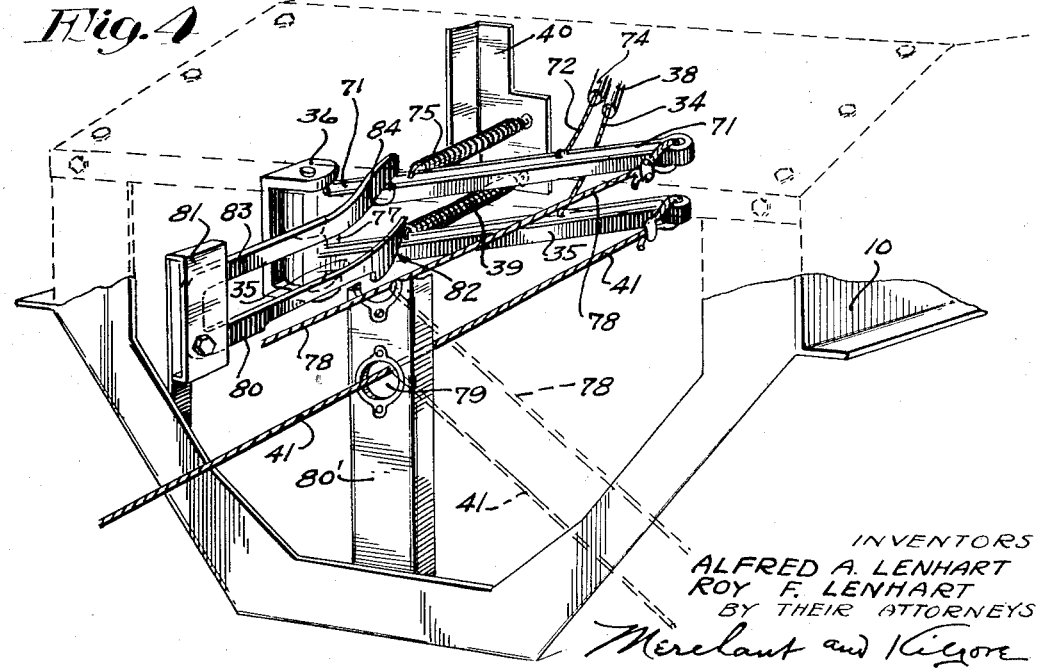
Fig. 4 is a perspective view of certain of the parts shown in Fig. 1 but looking at the wagon from the front thereof, on an enlarged scale.

When the doors 11 are held closed the trip arm 35 is yieldingly held by the spring 39 in its rearmost position and against the stop 77, as indicated in Fig. 4, slack is in the cable 34 and the dog 24 is holding the windlass shaft 21 against rotation with the main cables 14 wound on the drums 20. To cause the doors 11 to open, it is only necessary to draw forward on the cable 41 to lift the dog 24 out of its operative relation with the ratchet wheel 23 through the connections to the carrier 25. At the limit of the forward movement of the trip arm 35 the same is automatically engaged and held by the latch 80. With the windlass shaft 21 released, the doors 11 will swing open and unwind the cables 14 from the drums 20. This unwinding of the cables 14 will rotate the windlass shaft 21 backward and at which time, the clutch 48 being released, the sprocket wheel 47 will be loosely turned by the sprocket chain 43 about the axis of the countershaft 46.

To close the doors 11 the operator simply pulls forward on the cable 78 to set the clutch 48. During the initial forward movement of the arm 71 by the cable 78 it passes under the cam bar 83 and during its movement on the cam surface 84 lifts said bar, and hence, the latch 80, which release the trip arm 35 and causes the automatic reset of the dog 24 in an operative position. This position of the clutch arm 71 is indicated by full lines in Fig. 4.

Further forward movement of the clutch arm 71 will set the clutch 48 and cause the windlass shaft 21 to be driven from the countershaft 46 which is being constantly rotated from the right hand traction wheel 8 during the forward movement of the wagon. Under the rotation of the windlass shaft 21 by the clutch 48 the main cables 14 will be wound on the drums 20 and lift the doors 11. The operator continues to pull on the cable 78 to keep the clutch 48 set until the doors 11 strike the stop plates 13 and then releases the same. While holding the cable 78 the operator can tell by feeling when the doors 11 strike the stop plates 13 and then release said cable. In case the clutch 48 should not be released at the time the doors 11 strike the stop plates 13 the driven clutch member, to wit: the sprocket wheel 47, will slip in respect to the driving member of the clutch 48.

From the foregoing it is evident that the invention herein disclosed is capable of large range of modifications within the spirit of the invention herein disclosed and claimed.

What we claim is:

1. The combination with a dump wagon having a discharge opening and a door for closing said opening, of a windlass shaft, a cable attached to the door and arranged to be wound on the windlass shaft to close the door, locking means including a ratchet wheel on the windlass shaft and a cooperating dog for holding the windlass shaft against rotation to prevent unwinding of the cable when the door is closed, a gravity held carrier for the dog normally holding the dog in operative relation to the ratchet wheel, connections for lifting the carrier to render the dog inoperative, automatic means for holding the carrier raised, power means including a normally released clutch for driving the windlass shaft, means for setting the clutch, and other automatic means actuated by the clutch setting means for rendering the first noted automatic means inoperative.

2. The combination with a dump wagon having a discharge opening and a door for closing said opening, of a countershaft and a windlass shaft journaled on the wagon, a cable attached to the door and arranged to be wound on the windlass shaft to close the door, driving connections from one of the traction wheels of the wagon to the countershaft, a normally released friction clutch on the counter shaft, driving connections from the driven member of the clutch to the windlass shaft, the driving member of the clutch having a pair of disks arranged to be frictionally clamped onto the ends of the driven member of the clutch, means including a pair of shipper levers for moving the disks toward each other to frictionally hold said driven member, a toggle lever connecting the shipper levers, and means for operating the toggle lever to set or release the clutch.

3. The combination with a dump wagon having a discharge opening and a door for closing said opening, of power means, including a normally released clutch, for closing the door, means for holding the door closed, means for releasing the door holding means, locking means for holding said releasing means operative, means for releasing the clutch, and automatic means actuated by the clutch releasing means for rendering the locking means inoperative.

4. The combination with a dump wagon having a discharge opening and a door for closing said opening, of power means, including a normally released clutch, for closing the door, means for holding the door closed, manually operated means for releasing the door holding means, automatic means for holding said manually operated means operative, means for releasing the clutch, and other automatic means actuated by the clutch releasing means for rendering the locking means inoperative.

5. The combination with a dump wagon having a discharge opening and a door for closing said opening, of a windlass shaft, a cable attached to the door and arranged to be wound on the windlass shaft to close the door, locking means for holding the windlass shaft against rotation to prevent unwinding of the cable when the door is closed, power means including a normally released clutch for driving the windlass shaft to wind the cable thereon, means for setting the clutch, means for tripping the locking means out of action to release the windlass shaft and permit the door to open, automatic means for holding the locking means out of action, and other automatic means actuated by the means for setting the clutch for rendering the first noted automatic means inoperative.

6. The combination with a dump wagon having a discharge opening and a door for closing said opening, of a windlass shaft, a cable attached to the door and arranged to be wound on the windlass shaft to close the door, locking means including a ratchet wheel on the windlass shaft and a cooperating dog for holding the windlass shaft against rotation to prevent unwinding of the cable when the door is closed, a horizontally disposed carrier for the dog pivoted for vertical swinging movement and gravity positioned to hold the dog in operative relation to the ratchet wheel, means for lifting the carrier to render the dog inoperative, including a depending arm, pivoted at its upper end to the carrier, and a link connection from a relatively fixed support to the arm, a second pivoted arm, a one-way pull connection between the two arms, yielding means under strain to retract the second arm, power means including a normally released clutch for driving the windlass shaft to wind the cable thereon, means for setting the clutch, and automatic means for positively holding the second arm, against the action of the yielding means, when operated to release the one-way pull connection and allow the carrier to be positioned by gravity.

7. The structure defined in claim 6 which further includes other automatic means actuated by the means for setting the clutch for rendering the first noted automatic means inoperative.

ALFRED A. LENHART.
ROY F. LENHART.